No. 669,785. Patented Mar. 12, 1901.
E. W. GROESCHEL.
HOOK AND EYE.
(Application filed Aug. 29, 1900.)
(No Model.)
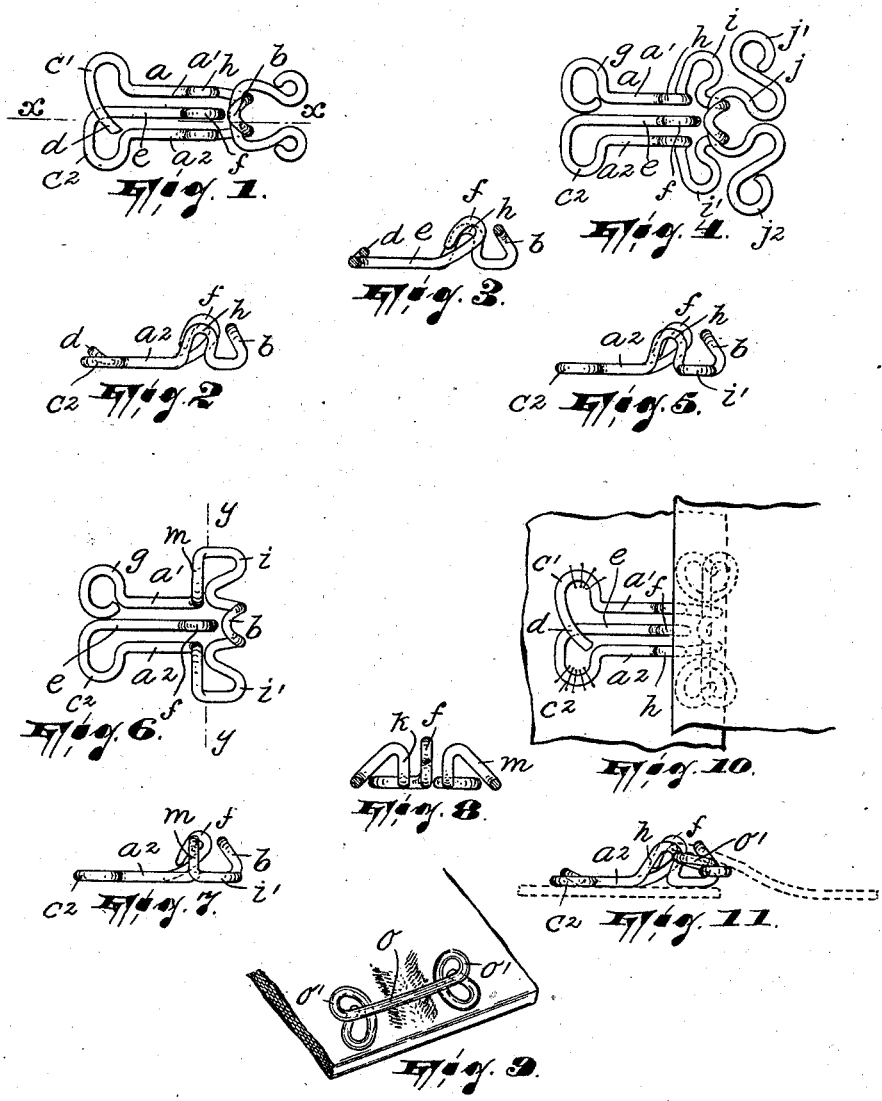
WITNESSES:
Wm. D. Bell.
Robert J. Pollitt
INVENTOR
Edwin W. Groeschel,
BY
Gartner & Steward,
ATTORNEYS.

UNITED STATES PATENT OFFICE.

EDWIN W. GROESCHEL, OF JERSEY CITY, NEW JERSEY.

HOOK AND EYE.

SPECIFICATION forming part of Letters Patent No. 669,785, dated March 12, 1901.

Application filed August 29, 1900. Serial No. 28,385. (No model.)

*To all whom it may concern:*

Be it known that I, EDWIN W. GROESCHEL, a citizen of the United States, residing in Jersey City, in the county of Hudson and State of New Jersey, have invented certain new and useful Improvements in Hooks and Eyes; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to hooks and eyes, and it has reference particularly to the kind of device of this nature in which the members are so constructed as to be proof against accidental disengagement.

One object of the invention is to so construct the members of the device as to render them readily susceptible of disengagement when it is intended to effect this, said members at the same time being proof, when connected, against accidental disengagement.

A further object of the invention is to so construct the hook member of the device that it will prevent the eye member from working back out of its proper seat at the bill end of the hook.

Referring to the accompanying drawings, Figure 1 is a top plan view of a hook and eye constructed after the principles of my invention. Figs. 2 and 3 are respectively a side view and a view on the line $x\,x$ in Fig. 1 of the hook shown in Fig. 1. Fig. 4 is a top plan view of a hook and eye, this figure showing particularly the parts as constructed especially with the object in view of facilitating their disengagement. Fig. 5 is a view in side elevation of the hook shown in Fig. 4. Fig. 6 is a modified form of a hook constructed after the principles of my invention. Figs. 7 and 8 are respectively a view in side elevation and a sectional view on the line $y\,y$ in Fig. 6 of the device shown in Fig. 6. Fig. 9 is a perspective view of a piece of goods, showing in position thereon one form of eye member that may be used; and Figs. 10 and 11 are a view in elevation and a side view of the meeting edges of goods, showing in position my improved hook and eye for connecting them.

The hook member of the device consists of a single piece of wire bent in such form as to produce the shank $a$, the bill $b$, and the eyelets $c'\,c^2$, these elements being the essential parts of a hook for a hook and eye. The shank members $a'\,a^2$ lie substantially parallel with each other throughout their entire length. One eyelet $c'$ of the device is composed of one end portion of the wire, the tip or extremity $d$ of said wire being extended over a tongue $e$, which is composed of the other end of the wire and extends from the rear end of the hook between and parallel to the shank members $a'\,a^2$, being spaced therefrom toward the bill end of the hook, where its free end is preferably turned up and back upon itself to form a loop $f$, which approximately contacts with the tip of the bill $b$. It should be remarked that the extremity $d$ of the wire is turned down into the eyelet $c^2$, so as to be shielded. Said extremity $d$ is crossed over the tongue $e$ for the reasons clearly set forth in my copending application, Serial No. 28,384, filed of even date herewith. The eyelet $c'$, if desired, may of course consist of the usual simple loop $g$. (Shown in Figs. 4 and 6.)

Near the bill $b$ the shank members are curved upwardly to form humps or projections $h$, disposed, preferably, each side of the loop of the tongue. These humps or projections are provided principally as abutments against which the eye member may take to keep it in its proper seat at the front part of the hook and prevent its working back on the shank members and under the tongue. They also serve as guards for preventing the tongue from being laterally displaced or bent out of position and afford guides for facilitating the disengagement of the eye member from the hook member.

As shown in my patented device, Letters Patent No. 628,143, of July 4, 1899, the bill is comparatively short and extends substantially at an angle of forty-five degrees relatively to the plane of the shank members, its tip projecting in approximate contact with the loop of the tongue, as above described.

It is to be remarked that the main portion of the tongue lies in the plane of the shank members, thus not only making it possible for securing-threads to be passed across the hook without danger of their being abraded or worn by the tongue, but also permitting the device to be connected to the edge portion of the goods with its upper face against the same without the tongue tending to appreciably elevate the goods where it extends over said tongue.

As shown in Fig. 4, the hook member, which may be otherwise substantially like that already described, (with or without the humps $h$,) is formed with anchorages $i\ i'$, disposed between the bill and the shank members. These anchorages extend outwardly and project forwardly—that is to say, toward the bill end of the hook—reaching into more or less alinement with the line of engagement in the bill between the hook and eye. Instead of employing the ordinary eye, substantially like that shown in Fig. 1, with the hook in question I prefer to use the eye member shown in Fig. 4, which consists of a continuous piece of wire having as the essential parts thereof the usual loop $j$ and eyelets $j'\ j^2$, the device being so shaped, assuming that the loops and eyelets are already produced, as to bring the eyelets more or less into alinement with the loop. In other words, the eyelets are projected forwardly just as the anchorages $i\ i'$ are. The object is in the case of both the hook and eye to bring their securing-points, which the eyelets in the eye member and the anchorages in the hook member afford, into such proximity to each other as certain conditions—for instance, more or less of a space between the edges of the garment or fabric—will permit.

As clearly set forth in my copending application, Serial No. 28,383, also filed of even date herewith, it will be seen that since the anchorages of the hook and the eyelets (or anchorages) of the eye member are in each case appreciably spaced or remote from each other and are brought up into proximity to an imaginary transverse line of engagement between the members their disengagement by twisting them in relatively opposite directions will be greatly facilitated. The wider the anchorages are spaced as compared with the width of the coupling afforded in the connected loop and bill of each device the better, because thereby greater leverage can be exerted. It will be seen that the width of the coupling referred to is comparatively little. When the members of the device are secured to the edge portion of a garment, said edge portions are, as it were, stiffened or made rigid for intervals of considerable length as compared with the widths of the connections or couplings between the members, and so since in the eye member especially the anchorages are brought up into proximity to the imaginary transverse line of engagement between said members the leverage may be properly exerted to separate the members and their couplings or connections may be twisted apart with the greatest facility and, be it emphasized, without stretching the goods adjacent said members.

The hook shown in Figs. 6, 7, and 8 is substantially like that shown in Fig. 4, with the exception that instead of having the humps $h$ in the shank members said humps extend transversely and are formed by turning the ends of the shanks first upwardly, as at $k$, and then downwardly and laterally at an incline, as at $m$, merging into the anchorages $i\ i'$ at their outer ends.

The eye member shown in Fig. 9 consists of a wire bent to form a straight bar $o$ and loops or eyelets $o'$ at the extremities of said bar, the ends of said bar overlapping the loops. By so shaping the device that the bar starts from the outside of each loop considerable rigidity is imparted to it. I do not claim this form of eye member, the same being duly described and claimed in my said copending application, Serial No. 28,384.

Having thus fully described my invention, what I claim as new, and desire to secure by Letters Patent, is—

1. A hook for a hook and eye consisting of the eyelets, bill and shank, the latter comprising two spaced members, and a tongue projecting toward said bill from the eyelet end of the hook and into approximate contact therewith, and humps or projections extending upwardly from said shank members and disposed in proximity to the bill end of the hook, substantially as described.

2. A hook for a hook and eye consisting of a piece of wire bent to form the eyelets, bill and shank, the latter comprising two spaced members, and a tongue projecting toward said bill from the eyelet end of the hook and into approximate contact therewith, and upwardly - extending humps or projections formed in the wire on both sides of the bill and disposed in proximity to the bill end of the hook, substantially as described.

3. A hook for a hook and eye consisting of the eyelets, bill and shank, the latter comprising two spaced members, and a tongue projecting toward said bill from the eyelet end of the hook and into approximate contact therewith, and humps or projections extending upwardly from said shank members and disposed in proximity to the bill end of the hook, said hook having laterally-disposed anchorages situated appreciably remote from each other and projecting into approximate transverse alinement with its point or points of engagement with the eye member, substantially as described.

In testimony that I claim the foregoing I have hereunto set my hand this 28th day of April, 1900.

EDWIN W. GROESCHEL.

Witnesses:
WILLIAM GROESCHEL,
JOHN W. STEWARD.